UNITED STATES PATENT OFFICE.

JONATHAN HARRIS AND GEORGE WASS, OF PAINESVILLE, OHIO.

PROCESS OF MAKING ANTI-FRICTION COMPOSITIONS.

SPECIFICATION forming part of Letters Patent No. 457,417, dated August 11, 1891.

Application filed September 5, 1890. Serial No. 364,068. (Specimens.)

*To all whom it may concern:*

Be it known that we, JONATHAN HARRIS and GEORGE WASS, of Painesville, in the county of Lake and State of Ohio, have invented an Improved Process of Producing an Anti-Friction Compound, of which the following is a full, clear, and exact description.

Our invention is a process of producing an anti-friction compound suitable for bearings or wearing-surfaces of different kinds, the same being composed of a metallic base having plumbago, with its lubricating properties intact, mechanically mixed or incorporated with it, substantially as hereinafter described.

We take, for instance, any quality of Babbitt metal, antimony, lead, tin, zinc, copper, or brass, as required, and mechanically mix with such metal or metals from one-sixth to one-third the quantity of plumbago, as follows: We melt, for instance, the metal first, and when cooled down, but before setting, mix the plumbago with it by stirring, whirling, or shaking. After the metal and plumbago have been thus mixed the compound is placed in any suitable former or die of any desired shape for fashioning it into a bearing or lining for a bearing and the compound then subjected to powerful pressure, which adds greatly to its strength and durability. It can be pressed either in hot or cold dies, according to the size of the bearing required. The compound thus produced is not only applicable to bearings or linings of bearings for shafting, but also for lining steam and other cylinders, either by casting the same in the cylinder as an entire lining or in the form of separated strips, and by its anti-friction properties it will serve to save much power that otherwise would be lost by the rubbing of iron and iron together.

This improved bearing metal or compound will be comparatively free from heating and cutting, and be to a large extent self-lubricating, inasmuch as the plumbago will absorb any oil that may be applied and retain it to keep a bearing for a length of time in good working order, even if oiling should be neglected. Applied as a shaft-bearing, it has the effect of polishing the shaft and filling up interstices in it, and from the well-known properties of the plumbago will greatly reduce friction.

Having thus described our invention, what we claim as new, and desire to secure by Letters Patent, is—

The herein-described process, which consists, first, in melting the metal base; second, allowing it to cool; third, adding plumbago to said base just before it sets, and, fourth, agitating the mass, as specified.

JONATHAN $\overset{\text{his}}{\underset{\text{mark}}{\times}}$ HARRIS.

GEORGE WASS.

Witnesses:
ALBERT BUTTEN,
J. W. BUNNELL.